Sept. 2, 1930.  E. A. FORSBERG  1,774,705

LIQUID COOLER

Filed Nov. 14, 1928

INVENTOR

Erik August Forsberg
BY
Busser and Harding
ATTORNEYS.

Patented Sept. 2, 1930

1,774,705

UNITED STATES PATENT OFFICE

ERIK AUGUST FORSBERG, OF STOCKHOLM, SWEDEN, ASSIGNOR TO THE DE LAVAL SEPARATOR COMPANY, OF NEW YORK, N. Y., A CORPORATION OF NEW JERSEY

LIQUID COOLER

Application filed November 14, 1928, Serial No. 319,414, and in Sweden November 30, 1927.

In the cooling of liquids, especially milk, it is known to wholly or partly immerse the vessel containing the liquid in cool water and to give the vessel a reciprocatory-rotative, or oscillatory, movement. It is known to effect this movement by means of a crank. It is also known to effect this movement by means of mechanical gearing from a motor rotating constantly in one direction at a constant speed. In an application filed by me of even date herewith, I have disclosed an improvement wherein the driving force is transmitted from a reciprocating motor. It is also known to suspend the milk container from a rod or shaft and to impart the desired oscillatory movement to such suspension rod, the milk container being suspended from a bail carried by the rod and partaking of its movements.

There are practical objections to all these power transmission devices, in that, by reason of the weight and momentum of the milk can and its contained liquid, the oscillating parts are subject to heavy shocks at each reversal of movement, thereby involving increased power consumption and strains on the driving motor and power transmitting elements.

The object of the present invention is to provide connections between the driving motor and the milk-containing vessel by means of which the shocks and strains incidental to prior devices may be avoided or minimized and the consumption of power substantially reduced.

Preferred embodiments of the invention are shown in the accompanying drawings, in which.

From a vertically extending rod $c$ is suspended a bail $b$ carrying a milk can $a$. It is preferred that the connection between the rod and the bail, and also the connection between the bail and the can, shall be rigid, instead of allowing play between these elements, as in prior constructions, in which either the can is swingable to some extent on the bail or in which the bail is hung by a hook from the suspension rod.

The motor is shown as one of the reciprocating type comprising a cylinder and a reciprocable piston $h$, the piston rod $i$ carrying a rack $e$ engaging a pinion $d$, whereby the latter is oscillated. Between the shaft of pinion $d$ and the upper end of rod $c$ is a coil spring $f$, which acts to transmit to the rod $c$ the oscillations of the pinion $d$. The spring may also carry the weight of the rod $c$, and the milk can suspended therefrom; but it is preferred to unload the spring of this weight by supporting the rod by means of a bearing $g$.

Figure 1:
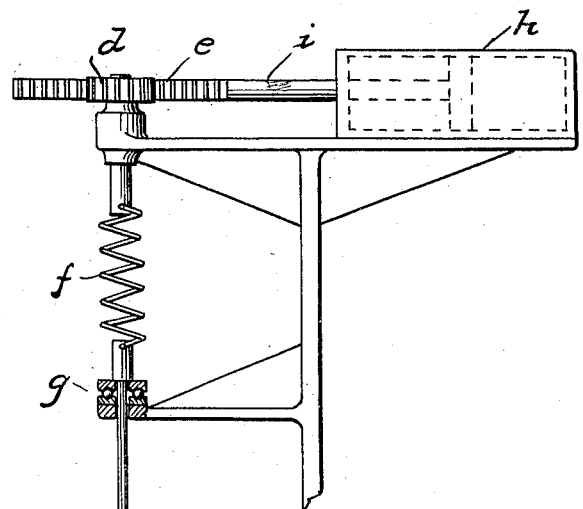
Fig. 1 is an elevational view of one embodiment of the invention.
Figure 2:
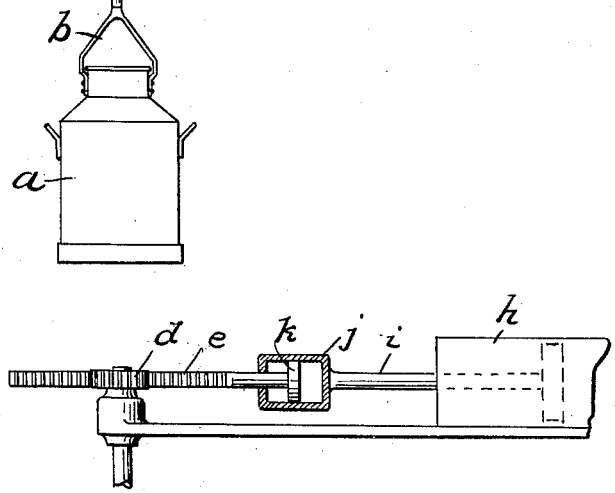
Fig. 2 is a partial view of a modification.

Instead of a spring $f$, any suitable flexible and elastic power driven element may be substituted; and such element need not be interposed between the movement-translating device and rod $c$, but may be differently positioned, as, for example, between the reciprocable or rotary power element and the movement translating device. In Fig. 2 is shown one of these possible modifications in which, between the piston rod $i$ and the rack $e$ is interposed an air cushion comprising a cylinder $j$ secured to the piston rod and a piston $k$ secured to the rack.

By means of the elastic connection between the driving motor and the milk vessel, the latter is not compelled to strictly follow the movements of the motor. Instead, there occur so called constrained oscillations, damped by the friction between the vessel and the liquids inside and outside the same. The oscillations of the vessel thus become harmonic, and by selecting an elastic connection having desired properties, such oscillations may be given a greater amplitude than oscillations strictly corresponding to the movement of the motor. At the same time, power consumption is decreased to that required for overcoming the mechanical friction in the moving parts of the apparatus and the damping friction in the movement of the vessel. This involves a minimum power consumption. All shocks are avoided, but at the same time the movement of reversal following the dead point of each oscillation is so strong that a good mixing of the contents of the vessel is secured.

Where reference is made to the immersion of a liquid-containing vessel in another liquid, it is to be understood that partial, as well as complete, immersion is contemplated.

Where in the claims the power transmission connections are referred to as non-rotating, it is intended to exclude any continuously rotating element as distinguished from such limited movement of a rotary character as is involved in ordinary oscillation.

What I claim and desire to protect by Letters Patent is:

1. The combination, with a vessel adapted to contain liquid to be cooled and to be immersed in a cooling liquid, of a reciprocating driving motor, and non-rotating connections between the motor and said vessel including a rod from the lower end of which said vessel is suspended, said connections adapted to impart to said rod an oscillatory movement and including an interposed flexible and elastic member adapted to allow said vessel to have oscillations of different amplitude from that of the driving motor, avoid shocks, decrease power consumption and insure a more effective mixing of the contents of the vessel.

2. The combination, with a vessel adapted to contain liquid to be cooled and to be immersed in a cooling liquid, of a vertically extending rod from the lower end of which said vessel is suspended, a reciprocating driving motor and non-rotating power transmission means driven therefrom, and a flexible and elastic device interposed between the power transmission means and the upper end of said suspension rod.

3. The combination, with a vessel adapted to contain liquid to be cooled and to be immersed in a cooling liquid, of suspension means to the lower end of which said vessel is rigidly connected, a reciprocating driving motor, and non-rotating driving connections between said motor and the upper end of said suspension means, said driving connection including a flexible and elastic member adapted to transmit the movement of said motor to said vessel and to modify and cushion said movement.

4. The combination, with a vessel adapted to contain liquid to be cooled and to be immersed in a cooling liquid, of a vertically extending rod from the lower end of which said vessel is suspended, a reciprocating driving motor and non-rotating power transmission means driven therefrom, and a coil spring one end of which is connected to said power transmission means and the other end of which is connected to the upper end of said suspension rod.

In testimony of which invention, I have hereunto set my hand, at Stockholm, Sweden, on this 31st day of October, 1928.

ERIK AUGUST FORSBERG.